(12) United States Patent
Takei et al.

(10) Patent No.: US 7,690,581 B2
(45) Date of Patent: Apr. 6, 2010

(54) METHOD AND APPARATUS FOR GENERATING A BARCODE WITH A HUMAN READABLE INTERPRETATION, A PRINTING APPARATUS, AND A PROGRAM

(75) Inventors: Teisuke Takei, Nagano-ken (JP); Tomoaki Kimura, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 168 days.

(21) Appl. No.: 11/550,325

(22) Filed: Oct. 17, 2006

(65) Prior Publication Data

US 2007/0084935 A1 Apr. 19, 2007

(30) Foreign Application Priority Data

Oct. 18, 2005 (JP) .............................. 2005-302792

(51) Int. Cl.
*G06K 19/06* (2006.01)
(52) U.S. Cl. .................................. 235/494; 235/462.01
(58) Field of Classification Search ................. 235/464, 235/462.01, 494
See application file for complete search history.

(56) References Cited

U.S. PATENT DOCUMENTS 5,811,781 A * 9/1998 Ackley .................. 235/462.01

2005/0012949 A1   1/2005 Kitahara et al.
2005/0178837 A1 * 8/2005 Hine et al. ............. 235/462.01

FOREIGN PATENT DOCUMENTS

| EP | 1179800 A2 | 2/2002 |
|---|---|---|
| JP | 11221946 | 8/1999 |
| JP | 200252759 | 2/2002 |
| JP | 2004348486 | 12/2004 |

OTHER PUBLICATIONS

UCC/EAN-128 Specification, http://www.morovia.net/education/symbology/ean-ucc-128.asp., Apr. 24, 2003, pp. 1-4.

* cited by examiner

*Primary Examiner*—Michael G Lee
*Assistant Examiner*—Rafferty Kelly (57) ABSTRACT

The present invention is a system and method for generating a barcode with a human readable interpretation (HRI), herein the barcode includes an application identifier. The characters are input as an input data set that is equivalent to the complete (HRI) with a special character immediately after the application identifier. Generating a barcode encoding data set for encoding the barcode is based on the input data set. Generating the barcode encoding data set includes interpreting the special character as a field separator between the application identifier and a data portion. Generating a data set for the human readable interpretation is based on the input data set and includes converting the special character to a symbol. Generating the barcode with the human readable interpretation includes combining the barcode encoding data set and the data set for the human readable interpretation.

14 Claims, 5 Drawing Sheets

SPECIAL CHARACTERS THAT ARE NOT ENCODED

| SPECIAL CHARACTER | ASCII Code | | HANDLING (HRI PROCESSING APPLIES WHEN A HRI IS ADDED.) |
| --- | --- | --- | --- |
| | HEXADECIMAL | DECIMAL | |
| ( | 28 | 40 | REPLACED WITH A HUMAN READABLE "(" USED IN COMBINATION WITH A CLOSING PARENTHESIS ")" TO DENOTE THE APPLICATION IDENTIFIER. USED TO IMPROVE THE APPEARANCE OF THE HRI LINE. |
| ) | 29 | 41 | THE FIRST ")" AFTER d1 IS HANDLED AS A FIELD SEPARATOR BETWEEN THE APPLICATION IDENTIFIER AND DATA PORTION, AND REPLACED BY A ")" IN THE HRI LINE. FOLLOWING ")" ARE REPLACED BY A ")" IN THE HRI LINE. |
| Space | 20 | 32 | THE FIRST SPACE AFTER d1 IS HANDLED AS A FIELD SEPARATOR BETWEEN THE APPLICATION IDENTIFIER AND DATA PORTION, AND REPLACED BY A SPACE IN THE HRI LINE. FOLLOWING SPACES ARE REPLACED BY A SPACE IN THE HRI LINE. |
| * | 2A | 42 | REPLACED BY THE VALUE OF THE CHECK DIGIT AS CALCULATED FOR THE DATA PORTION USING MODULUS 10. THE ASTERISK IS ALSO REPLACED IN THE HRI LINE BY THE VALUE OF THE CHECK DIGIT A. |

FIG. 4A

SPECIAL CHARACTERS THAT ARE ENCODED

| SPECIAL CHARACTER | ASCII Code | | HANDLING (HRI PROCESSING APPLIES WHEN A HRI IS ADDED.) |
| --- | --- | --- | --- |
| | HEXADECIMAL | DECIMAL | |
| FNC1 {1 | 7B, 31 | 123, 49 | INPUT DATA FROM A SPACE OR "}" TO THE FNC1 CHARACTER IS HANDLED AS THE DATA PORTION OF THE DATA SET. THE FNC1 CHARACTER IS REPLACED BY A SPACE IN THE HRI LINE. |

FIG. 4B

- "_" DENOTES A SPACE.
- "{1}" DENOTES THE FNC1 CHARACTER.
- SHADING DENOTES THE CALCULATED VALUE OF THE CHECK DIGIT A.

| EXAMPLE | INPUT DATA | BARCODE ENCODING DATA | HRI CHARACTER DATA |
|---|---|---|---|
| a-1 | (02)1234567 | 021234567 | (02)1234567 |
| a-2 | 02_1234567 | 021234567 | 02_1234567 |

FIG. 5A

| EXAMPLE | INPUT DATA | BARCODE ENCODING DATA | HRI CHARACTER DATA |
|---|---|---|---|
| b-1 | (02)1234567* | 021234567▨ | (02)1234567▨ |
| b-2 | (02)123*{1(004)125* | 02123▨{1004125▨ | (02)123▨_(004)125▨ |
| b-3 | 02_123*{1004_125* | 02123▨{1004125▨ | 02_123▨_004_125▨ |

FIG. 5B

| EXAMPLE | INPUT DATA | BARCODE ENCODING DATA | HRI CHARACTER DATA |
|---|---|---|---|
| c-1 | ($02$)1234567 | 021234567 | ($02$)1234567 |
| c-2 | $02$_1234567 | 021234567 | $02$_1234567 |

FIG. 5C

METHOD AND APPARATUS FOR GENERATING A BARCODE WITH A HUMAN READABLE INTERPRETATION, A PRINTING APPARATUS, AND A PROGRAM

RELATED APPLICATIONS

Japanese patent application No.: 2005-302792, is hereby incorporated by reference in its entirety.

BACKGROUND OF THE INVENTION

1. Field of the Invention

The present invention relates to a method and an apparatus for generating a barcode with an application identifier and a human readable interpretation.

2. Description of the Related Art

Barcodes are widely used in product management and distribution control, and many software applications for generating and printing barcodes are available. See, for example, Japanese Unexamined Patent Application Publication H11-221946.

Using the JAN code as an example, when the user enters the text to be converted to a barcode, the application converts the text, which is the human readable interpretation (HRI) of the barcode, to the barcode symbols. The human readable interpretation can be selectively printed as human-readable text below the barcode symbol as required. A barcode with a HRI can therefore be generated by simply inputting the text that is printed on the HRI line.

As such barcodes have become increasingly common in the distribution industry with the development of POS (point-of-sale) systems, EOS (electronic ordering systems), EDI (electronic data interchange) and other types of distribution data management systems, the UCC/EAN-128 barcode standard (now known as GS1-128) has grown in use due to demand for more sophisticated product management and distribution control systems.

Unlike JAN barcodes, however, UCC/EAN-128 barcodes with an HRI line cannot necessarily be correctly produced by simply inputting the HRI text for the following reasons.

(1) Because UCC/EAN-128 barcodes are used in the distribution industry, an application identifier is used to identify various types of distribution and product management information. The barcode is generated from a data set combining an application identifier with a following data unit.

(2) The HRI line printed below the barcode symbol must also include the application identifier in a human readable form.

A problem with barcodes that use an application identifier when an HRI line is added is the HRI text must be input separately from the data used to generate the barcode symbol. Thus, more time is required for data input.

Other issues with UCC/EAN-128 barcodes include the following.

(3) Multiple data sets can be connected together using special characters (called function code characters).

(4) A check digit (modulus 10) must be calculated in many cases.

As a result of these issues, inputting the HRI text separately from the data to be encoded in the barcode takes even longer.

SUMMARY OF THE INVENTION

The present invention is a method and an apparatus for generating a barcode with an application identifier and a human readable interpretation to be input quickly and easily.

A method according to the present invention generates a barcode with a human readable interpretation. The barcode includes an application identifier. The method has an input step of inputting characters as an input data set that is equivalent to the complete human readable interpretation. The input data set may include a first special character immediately before an application identifier. The input data set includes a second special character immediately after the application identifier. A first generating step ignores the first special character and interprets the second special character as a field separator between the application identifier and a data portion following the application identifier. The first generating step also generates a barcode encoding data set for encoding in the barcode symbol based on the input data. A second generating step may include converting the first special character to a "(" and the second special character to a ")" to generate data for the human readable interpretation based on the input data. A merging step combines the barcode encoding data and the human readable interpretation data to generate a barcode with a human readable interpretation.

By inputting all characters that are equivalent to the human readable interpretation of the barcode with a first special character immediately before and a second special character immediately after the application identifier, the data to be encoded in the barcode symbol and the data to be printed in the HRI line with the barcode symbol can both be entered with a single data input operation. Furthermore, by bracketing the application identifier with parentheses ("(" and ")") as data for the HRI characters, the application identifier can be easily recognized in the HRI line. More specifically, when generating a barcode with a human readable interpretation according to a specification that requires including the application identifier recognizably in the human readable interpretation, the barcode data and the data for the human readable interpretation do not need to be entered in separate steps, and data input is therefore faster and easier.

A further embodiment of the present invention is an additional method of generating a barcode with a human readable interpretation where the barcode uses an application identifier. An input step of receiving characters that are equivalent to a complete human readable interpretation with a third special character inserted immediately after the application identifier. A first generating step of interprets the third special character as a field separator between the application identifier and a data portion following the application identifier. The first generating step generates a barcode encoding data set for encoding in the barcode symbol based on the input data. A second generating step of converting the third special character to a "_" (space) to generate data for the human readable interpretation based on the input data. A merging step combines the barcode encoding data and the human readable interpretation data to generate a barcode with a human readable interpretation.

By inputting all characters that are equivalent to the human readable interpretation of the barcode with a third special character immediately after the application identifier, the data to be encoded in the barcode symbol and the data to be printed in the HRI line with the barcode symbol can both be entered with a single data input operation. Furthermore, by inserting a space "_" immediately after the application identifier as data for the HRI characters, the application identifier can be easily recognized in the HRI line. More specifically, when generating a barcode with a human readable interpretation according to a specification that requires including the application identifier recognizably in the human readable interpretation, the barcode data and the data for the human readable interpretation do not need to be entered in separate steps, and data input is therefore faster and easier.

In a method of generating a barcode with a human readable interpretation according to an embodiment of the invention, the first generating step may generate the barcode encoding data using only numeric characters in the text input in the input step.

By generating the barcode encoding data using only numeric data, the user can specify (input) any desired characters (including non-numeric characters) for inclusion in the HRI character data.

In a method of generating a barcode with a human readable interpretation according to an embodiment of the invention, a fourth special character may be inserted at a check digit input position in the input step. The first generating step may replace the fourth special character with the calculated check digit value and generate the barcode encoding data. The second generating step replaces the fourth special character with the calculated check digit value and generates data for the human readable interpretation.

This embodiment of the invention enables generating a barcode with a human readable interpretation from a single data entry even when a check digit is included in the barcode symbol. The user can also freely specify where the check digit is inserted.

A method of generating a barcode according to an embodiment of the invention may generate a barcode containing a plurality of data sets each comprising an application identifier and data portion. A fifth special character is inserted between adjacent data sets in the input step; the first generating step interprets the fifth special character as a separator between data sets, and generates barcode encoding data; and the second generating step converts the fifth special character to a space character, "_" (which is represented in this application as the underscore character) to generate data for the human readable interpretation based on the input data.

This embodiment of the invention enables generating a barcode with a human readable interpretation from a single data entry even for barcodes containing a plurality of data sets each containing an application identifier and a data portion.

In a method of generating a barcode with a human readable interpretation according to the invention the barcode may be a UCC/EAN-128 barcode.

The invention can thus be used with UCC/EAN-128 barcodes, which are widely used in the distribution industry.

A printing apparatus according to another embodiment of the invention has the means of the apparatus for generating a barcode with a human readable interpretation described above, and a printer for printing the generated barcode with a human readable interpretation.

This embodiment of the invention can provide a barcode using an application identifier with a human readable interpretation to a printer for printing based on a single data input.

A program according to another embodiment of the invention causes a computer to execute the steps of the method for generating a barcode with a human readable interpretation according to the present invention.

By executing this program, data for a barcode using an application identifier with a human readable interpretation can be input quickly and easily.

Other objects and attainments together with a fuller understanding of the invention will become apparent and appreciated by referring to the following description and claims taken in conjunction with the accompanying drawings.

DESCRIPTION OF THE PREFERRED EMBODIMENTS

A preferred embodiment of the present invention is described below with reference to the accompanying figures.

A method and an apparatus for generating a barcode with a human readable interpretation, a printing apparatus and a program according to the present invention are described below.

The invention enables generating a barcode that uses an application identifier and is printed with a human readable interpretation (HRI) based on a single data input operation, thus eliminating the need to input the data to be encoded in the barcode symbol separately from the data to be included in the HRI line.

The method of generating a barcode with an HRI line and other aspects of the invention are described below using by way of example a printing system including a host computer and a printer for printing based on data received from the host computer.

A UCC/EAN-128 barcode is also used by way of example as a barcode that uses an application identifier.

Figure 1:
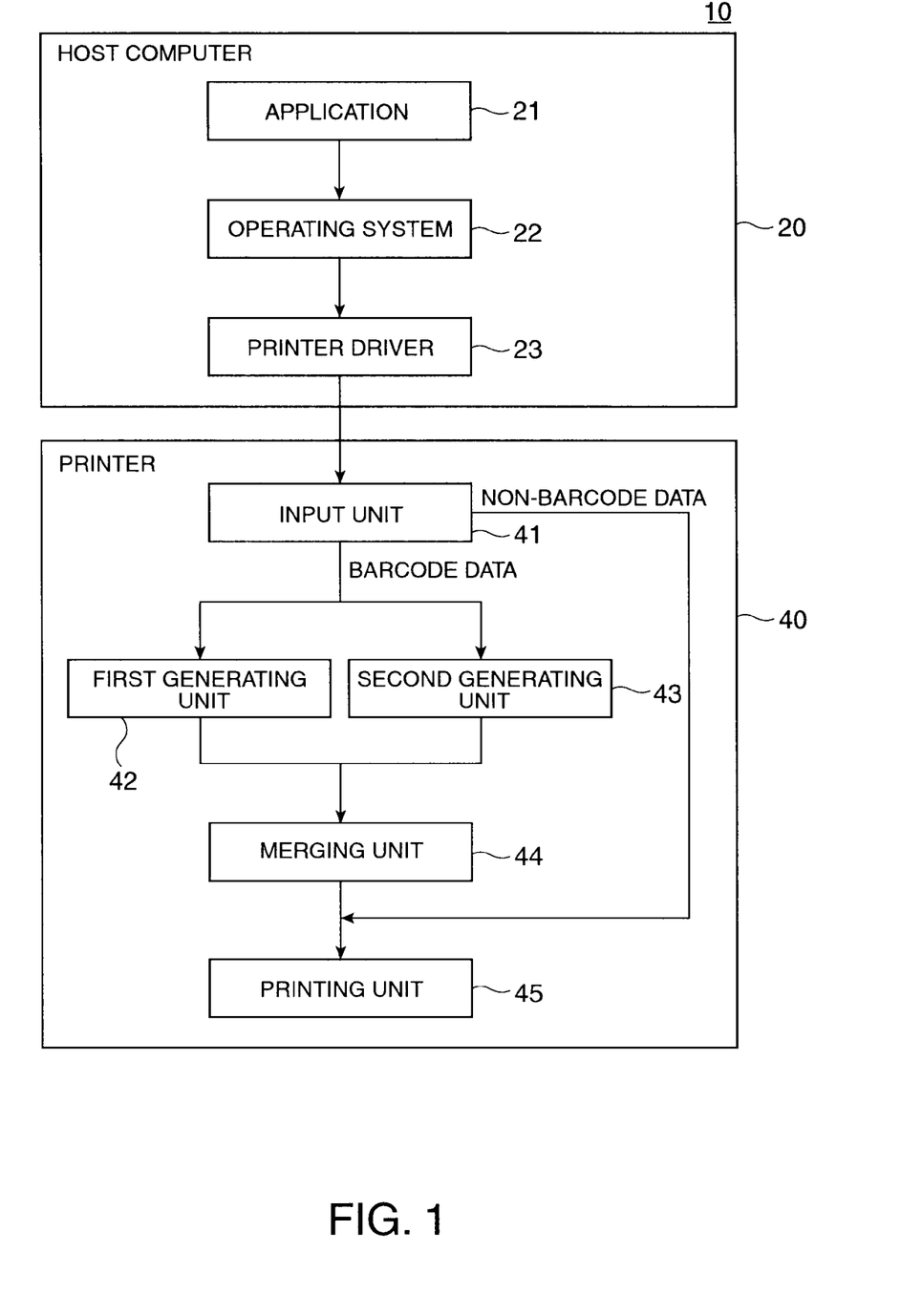
FIG. 1 is a block diagram of a printing system according to a preferred embodiment of the invention.

FIG. 1 is a block diagram of a printing system 10 according to a preferred embodiment of the invention. The printing system 10 includes a host computer 20 such as a personal computer connected over a wireless or wired LAN, for example, to a printer 40 that can print barcodes. Alternatively printing system 10 may incorporate the essential features of the host computer 20 and the printer 40 into a single integrated device.

The host computer 20 may include an application 21, an operating system 22 that is the basic program controlling the host computer 20, and a printer driver 23 for controlling printing on the printer 40. The application 21 is a program for generating data (such as text data, graphic data or tabular data) including a UCC/EAN-128 barcode B.

Figure 2:
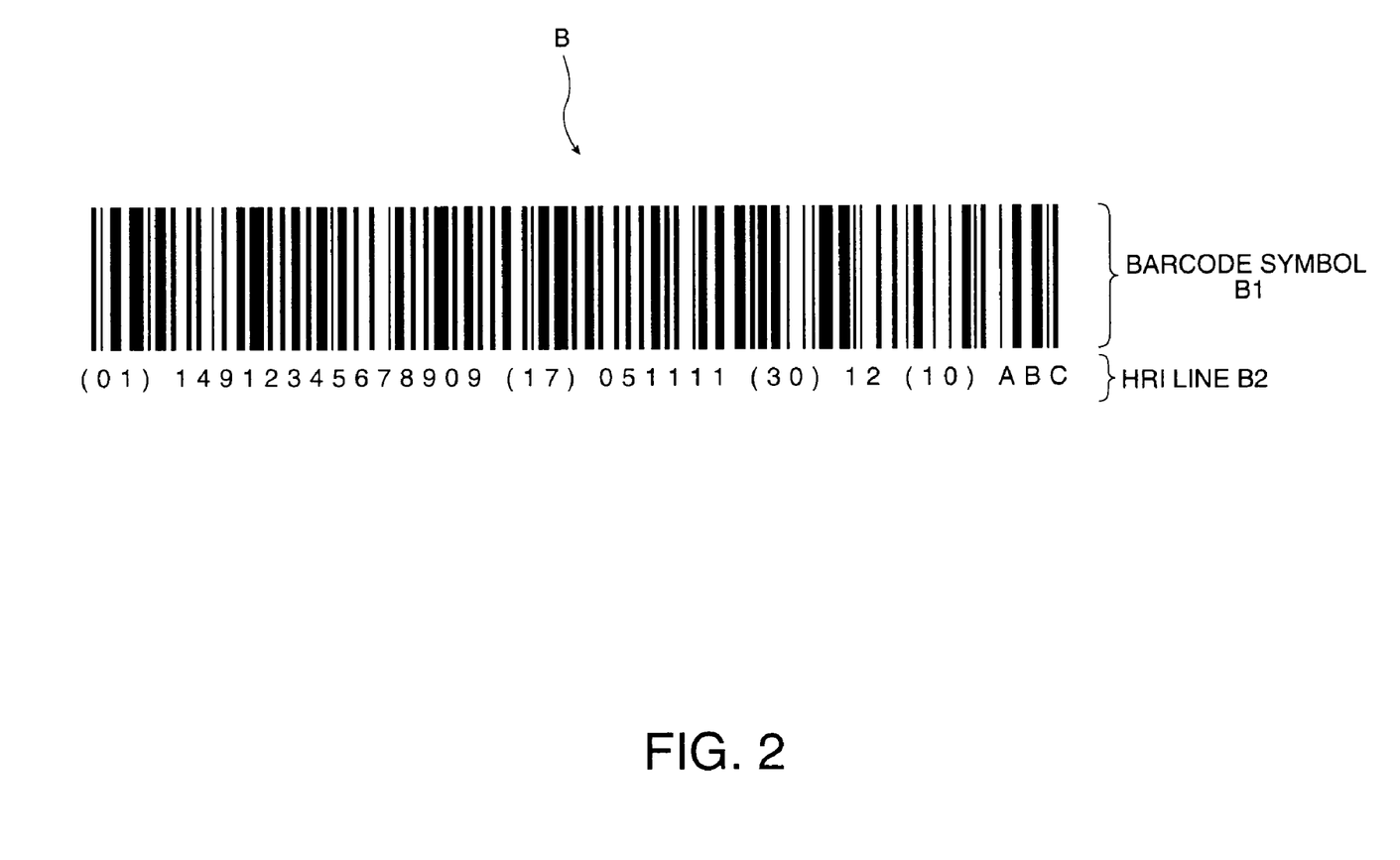
FIG. 2 shows an example of a UCC/EAN-128 barcode.

As shown in FIG. 2, a UCC/EAN-128 barcode B includes a barcode symbol B1 representing the encoded data, and an HRI line B2 (human readable interpretation) located below the barcode symbol B1. To print a document containing this UCC/EAN-128 barcode B, the user starts the application 21 and uses a keyboard or other input device to input the data to be printed on the HRI line B2 (the "input data" in FIGS. 5A-C).

The application 21 gets the data for the HRI line B2 as the barcode data for printing the UCC/EAN-128 barcode B. The application 21 generates document data containing the barcode data based on other input from the user, and outputs the document data through the operating system 22 to the printer driver 23. Whether the application 21 adds the HRI line B2 to the barcode symbol B1 is selectable, and data related to this selection is output together with the barcode data. Note that the following description assumes that the user selected to add the HRI line B2.

The printer driver 23 then converts the document data generated by the application 21 to a command format that can be interpreted by the printer 40, and outputs the converted data with the barcode data to the printer 40. In this embodiment of the invention the printer driver 23 outputs the barcode data directly to the printer 40 without further processing (that is, directly outputs the data corresponding to the "input data" in FIGS. 5A-C).

The printer 40 has an input unit 41 for receiving the input data output by the host computer 20, a first generating unit 42, a second generating unit 43, a merging unit 44, and a printing unit 45. Alternatively the first generating unit 42, the second generating unit 43 and the merging unit 44 may be implemented as software on the host computer 20, or in an entity separate from the host computer 20 and the printer 40.

The first generating unit 42 generates the data encoded in the barcode symbol B1 based on the barcode data contained in the input data, and the second generating unit 43 similarly generates the data for printing the HRI line B2 (the "HRI character data" below) based on the barcode data.

The merging unit 44 merges the encoding data and HRI character data generated by the first generating unit 42 and the second generating unit 43 to generate a barcode with an HRI line B as shown in FIG. 2.

The printing unit 45 then prints the barcode with an HRI line B generated by the merging unit 44 and other data received by the input unit 41. Data other than the barcode data received by the input unit 41 is thus not processed by the first generating unit 42, the second generating unit 43 and the merging unit 44.

Figure 5A:
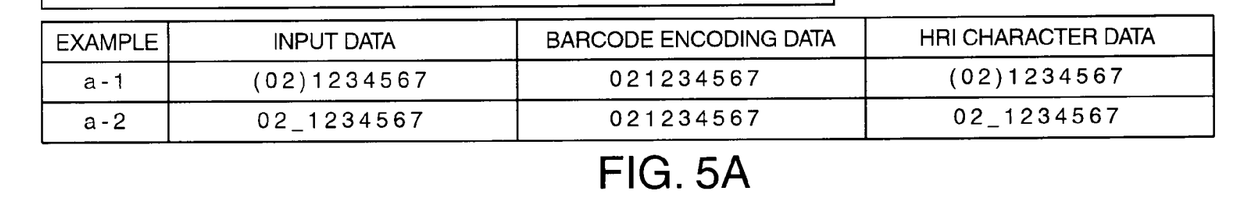
FIG. 5 describes the process of generating barcode data and HRI character data from the input data

When the input unit 41 gets the data string "(02)1234567" as the barcode data as shown in example a-1 in FIG. 5A, for example, the input unit 41 outputs the input data to the first generating unit 42 and the second generating unit 43.

The first generating unit 42 strips special characters, the opening parenthesis "(" (special character 1) and the closing parenthesis ")" (special character 2) in this example, from the input string "(02)1234567" to generate the data string "021234567" encoded in the barcode symbol B1. As described in further detail below, the first generating unit 42 may strip all non-numeric characters as well as these special characters from the encoded data string (that is, it may encode only numeric characters). Alternatively only the application identifier or the data portion of the data set may be limited to numeric characters. Characters in the input data not supported by the symbology (such as, but not limited to UCC/EAN-128) may be ignored by first generating unit 42 yet still processed by second generating 43.

The second generating unit 43 converts the special characters "(" and ")" contained in the input data string "(02)1234567" to the same characters "(" and ")" in human readable form and outputs the resulting HRI line data "(02) 1234567". The first generating unit 42 and second generating unit 43 can operate in parallel or sequentially.

The merging unit 44 then combines the barcode data "021234567" with the HRI character data "(02)1234567" to generate print data for printing a barcode with an HRI line B.

The printer 40 can thus generate both the encoded data 021234567 and the corresponding HRI character data (02) 1234567 based on the single data entry (input data) (02) 1234567, and the user is therefore saved the time and trouble of separately inputting the data to be barcoded and the HRI character data.

The process whereby the first generating unit 42 and the second generating unit 43 generate the barcode symbol and HRI character data based on input data from the input unit 41 is described in further detail below.

Figure 3A:
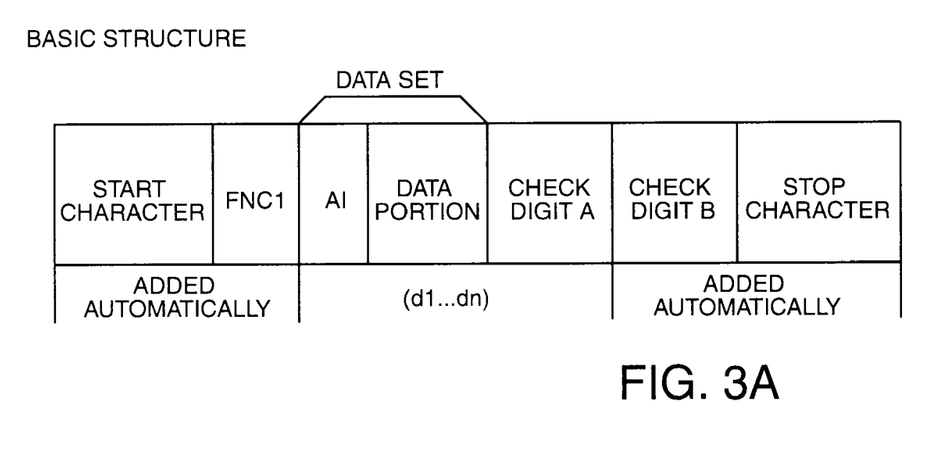
FIG. 3 describes the data format of a UCC/EAN128 barcode.
Figure 3B:
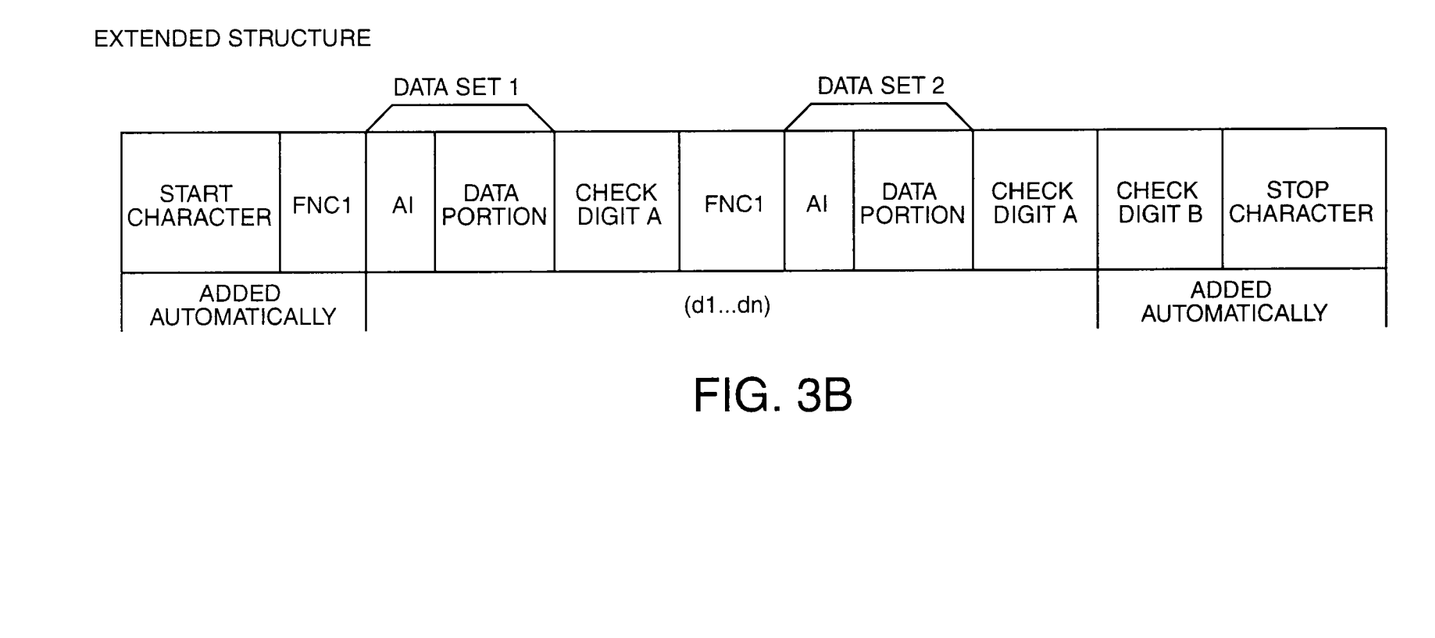

The data format of a UCC/EAN-128 barcode B (barcode symbol B1) is described first with reference to FIG. 3. FIG. 3A shows the basic structure of a UCC/EAN-128 barcode B and FIG. 3B shows the structure of a barcode containing more than one data set.

The UCC/EAN-128 barcode B is an application standard based on the Code 128 specification, and differs from normal Code 128 symbology in the addition of a function code character FNC1, (i.e. "{1") after the start character (start code). In addition, the application identifier ("AI" in FIGS. 3A-B), following the function code, and the data portion, following the application identifier, together render a single "data set". The check digit A, following the data set, is calculated by taking the modulus 10 of the data portion of the data set. A check digit B may be calculated by taking the modulus 103 of the sum of the start code value plus the product of each character position and the character value of the character at that position. The check digit B and a stop character (stop code) are added to the end of the basic barcode symbol.

Of these elements, the start character, FNC1, check digit B, and stop character are automatically added to the encoded data by the first generating unit 42 or the merging unit 44 (see FIG. 1), and the user does not need to enter any data corresponding to these elements. More specifically, the user only needs to enter data corresponding to the application identifier, the data set and the check digit A as the input data ((d1 ... dn), see FIGS. 5A-C).

The application identifier is used together with the data portion of the data set, and is used for identifying the content of the data portion. The application identifier is typically a code of two to four digits, and within the context of a UCC/EAN-128 barcode B specifically defines a packaging identifier for a container or a carton number, a product identifier, a quantity, a weight unit identifier a weight, a volume, a shipping management identifier or a serial number, for example. The application identifier is also not limited to data items, but can also define data attributes (such as numeric, alphabetic, or alphanumeric), number of digits and the data sequence, so that the information can be read accurately by anyone regardless of industry.

In the example shown in FIG. 2, the application identifiers are the numbers contained in parentheses in the HRI line B2. The first application identifier (01) means that the fourteen digits in the following data block contain a Global Trade Item Number (GTIN). The second application identifier (17) means that the following six digits represent a product or drug expiration date or a recommended warranty period such as a "use by" date in the YYMMDD format. The application identifier (30) denotes a quantity or volume value contained in a variable number of digits, and the application identifier (10) denotes a lot number, batch number, process number or other value in a variable length alphanumeric code.

As shown in the UCC/EAN-128 barcode B in FIG. 2, a single UCC/EAN-128 barcode B can contain multiple data sets each containing an application identifier and data. FIG. 3B shows the structure of a barcode containing multiple data sets (d1 to dn) when two data sets (data set 1, data set 2, and special characters indicating insertion of a check digit in each data set) is the input data.

As shown in FIG. 3B, when two or more data sets are combined in a single barcode symbol, a non-data character known as a function 1 character or FNC1 character (special character 5) is inserted as a field separator in the data. The FNC1 character is needed to separate the data sets during decoding because the data blocks are not necessarily a fixed length. If the data blocks are fixed length, the FNC1 character can be omitted. An embodiment of the present invention may add the FNC1 character whether or not the data block is a fixed length block. Note that the FNC1 character does not need to be inserted after the last data set.

Figure 4A:
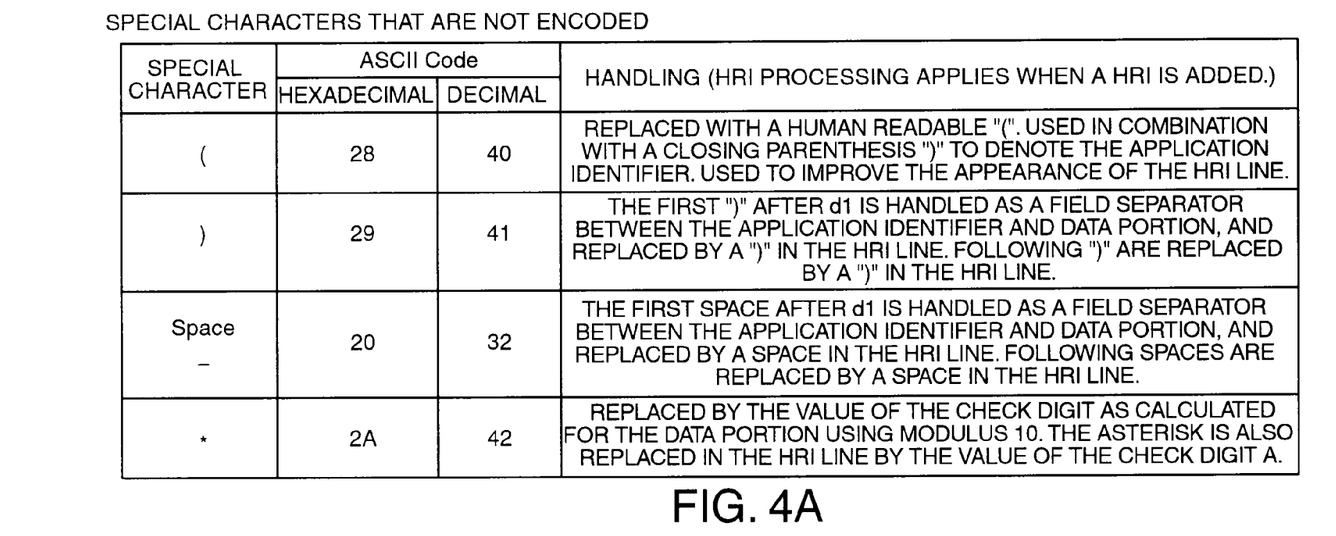
FIG. 4 describes examples of special characters.
Figure 4B:
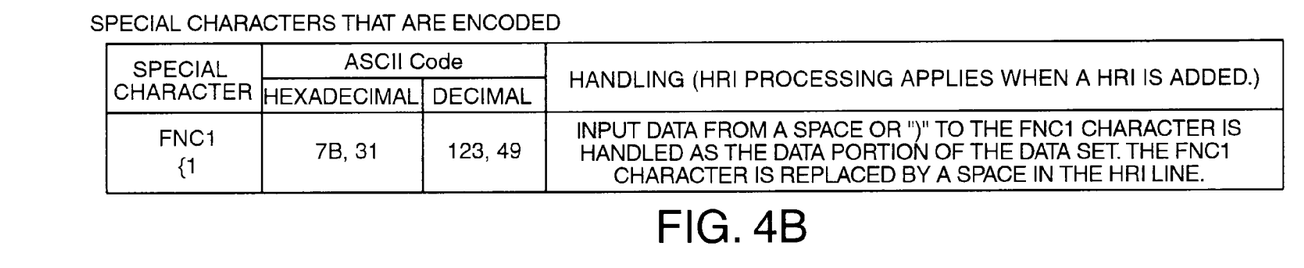

Special characters and how they are handled are described next with reference to FIGS. 4A-B. FIG. 4A shows the special characters that are not encoded in the barcode symbol, and FIG. 4B shows special characters that are encoded in the barcode symbol.

As shown in FIG. 4A, the first generating unit 42 does not process (that is, it ignores) the opening parenthesis "(" (special character 1) representing the decimal ASCII code 10 (28 in hexadecimal) while the generating unit 43 converts the same character to a human-readable parenthesis "(" included in the HRI character data.

If a closing parenthesis ")" (special character 2) representing the decimal ASCII code 41 (29 in hexadecimal) is used at the beginning of the input data, the generating unit 42 may process the closing parenthesis as a divider between the application identifier and the data portion while the second generating unit 43 may convert the special character 2 to a human-readable ")" to generate the HRI character data. The first generating unit 42 may ignore the second and subsequent closing parenthesis ")" in the input data while the second generating unit 43 converts each closing parenthesis to a human readable character ")".

If a space (ASCII code 32 (20 hexadecimal); special character 3) is used at the beginning of the input data, the first generating unit 42 may assume the space denotes an application identifier while the second generating unit 43 may insert a space in the HRI line B2. The first generating unit 42 may ignore the second and subsequent spaces in the input data, while the second generating unit 43 may convert each space to an underscore character "_".

The first generating unit 42 may convert an asterisk "*" (ASCII code 42 (2A hexadecimal); special character 4) to the check digit A calculated using modulus 10 for the data portion of the data set. The second generating unit 43 may also convert an asterisk "*" to the value of the check digit A.

As shown in FIG. 4B, the FNC1 character (special character 5) expressed as ASCII codes 123 and 49 (7B and 31 in hexadecimal and the text symbols "{1") is used by the first generating unit 42 to extract a data portion and check digit from the preceding space or closing parenthesis ")" to the FNC1 character. The FNC1 character may be converted to a space by the second generating unit 43.

The application identifier and data portion of each data set are processed as follows using the defined special characters.

(1) The first generating unit 42 handles from the first data (d1) or FNC1 character to the next space or the FNC1 character and the opening parenthesis to the closing parenthesis as the application identifier, and from the space or closing parenthesis to the last data (dn), asterisk, or FNC1 character as the data portion of the data set.

(2) The first generating unit 42 encodes only numbers as the application identifier, and ignores all non-numeric data.

(3) The second generating unit 43 includes both numeric and non-numeric parts of the application identifier in the HRI line B2.

Figure 5B:
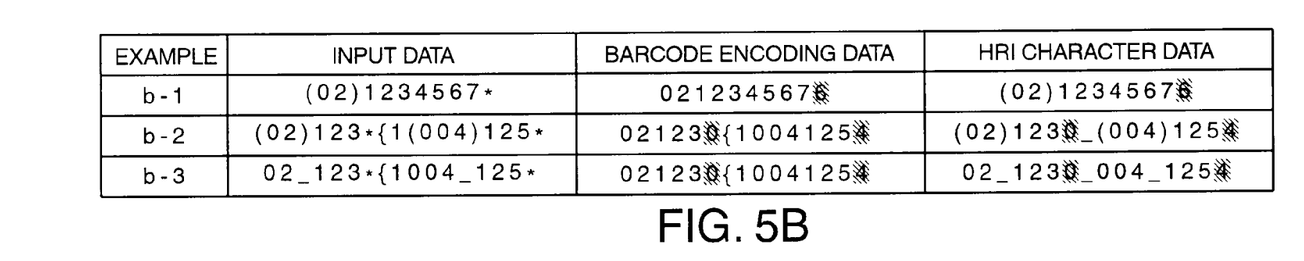

Some examples of generating the encoded barcode data and HRI character data based on the input data are described next with reference to FIGS. 5A-C. Note that in FIGS. 5A-C an underscore character "_" denotes a space, "{1" denotes the FNC1 character and shaded characters denote the check digit A value.

As shown in example a-1 in FIG. 5A, when the input data is "(02)1234567", the special character "(" is ignored, the special character ")" is interpreted as separating the application identifier and the data portion, and "021234567" is output as the encoded barcode data.

The special character "(" and the special character ")" are converted to a human readable "(" and ")", respectively, to generate the HRI character data.

It should be noted that the special characters and the corresponding characters converted to human readable form in the HRI character data are the same in this example, but are not necessarily the same. For example, the inequality signs "<" and ">" could be used as the special characters and converted to parentheses "(" and ")" in the HRI character data.

If the input data is 02_1234567 as shown in input example a-2, the special character "_" is interpreted as separating the application identifier and data portion, and "021234567" is output as the encoded barcode data.

The special character "_" is converted to a human readable "_" to generate the HRI character data. As noted above the special character "_" in the context of FIGS. 5A-C denotes a space.

It should be noted, in example a-2, the special character and the corresponding character converted to human readable form in the HRI character data are the same, but is not necessarily the same.

If the input data is (02)1234567* as shown in input example b-1, the special character "*" is converted to the value of the check digit (6) calculated for the data portion "1234567" and added to the end of the data to output the encoded barcode value 0212345676.

The special character "(" and the special character ")" are converted to a human readable "(" and ")", respectively, to generate the HRI character data.

The special character "*" is also converted to the value of the check digit (6) to generate the HRI character data "(02)1234567".

If the input data is (02)123*{1(004)125* as shown in input example b-2, from the closing parenthesis ")" to the special character "{1" is interpreted as the data portion and the check digit "0" is calculated. In addition, from the next ")" to the end is interpreted as a data portion and the check digit "4" is calculated. The resulting encoded barcode data is therefore "021230{10041254".

The special character "{1" is also converted to a space character "_" to output the HRI character data "(02)1230_(004)1254".

As a result, if the special character "{1" is included in the input data, the special character "{1" is interpreted as a connector between plural data sets, specifically "(02)1230" and "(004)1254" in this example.

In input example b-3, the special characters "(" and ")" surrounding the application identifiers in example b-2 are simply replaced by the special character "_" and the barcode encoded data is the same. The HRI character data is "02_1230_004_1254".

Figure 5C:
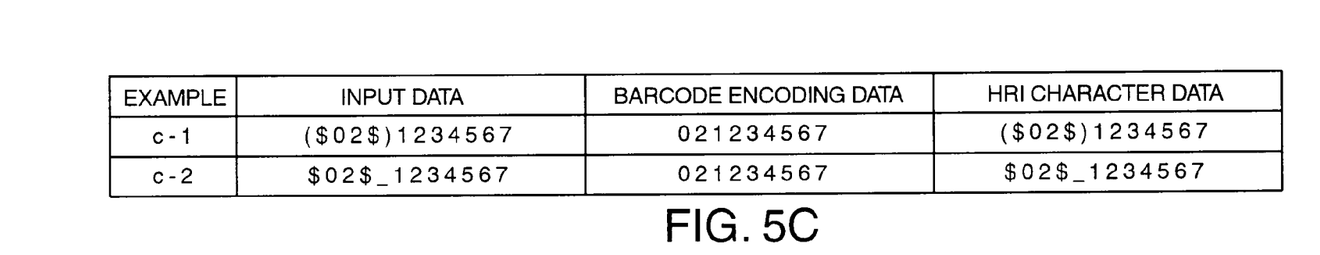

If non-numeric characters are included in the application identifier in the input data "($02$)1234567" as shown in example c-1 in FIG. 5C, the two dollar signs "$" in this example are ignored by the first generating unit 42 because only numeric data is encoded, and the encoded barcode data therefore represents "021234567". The HRI character data is "($02$)1234567", however, because all characters surrounded by the parentheses "(" and ")" are also included in the HRI character data.

In input example c-2, the special characters "(" and ")" surrounding the application identifiers in example c-1 are simply replaced by the special space character "_" and the encoded barcode data is therefore the same. However, because the special space character "_" is converted to a human readable space, the HRI character data is "$02$_ 1234567".

The invention thus enables generating both the data to be encoded in the barcode symbol and the corresponding HRI character data by simply inputting the data with the application identifier enclosed between two predetermined special characters or with a predetermined special character inserted immediately after the application identifier. Furthermore, by enclosing the application identifier in parentheses "(" and ")" or inserting a space immediately after the application identifier in the HRI character data, the user can also easily recognize the application identifier in the HRI line.

Therefore it becomes unnecessary to input data encoded in the barcode symbol separately from information contained in the HRI character data when generating a barcode B with an HRI line B2 according to a specification that requires including the application identifier in human readable form in the HRI line B2. Data can thus be entered quicker and easier.

Furthermore, because the first generating unit 42 encodes only the numeric part of the data (text) input by the input unit 41, the user can specify any desired characters (including symbols and letters) for inclusion in the HRI line B2.

Yet further, because the first generating unit 42 and second generating unit 43 convert a predetermined special character (such as an asterisk "*") to the check digit value, the present invention can also be used with barcodes having a check digit. The user can also freely specify where the check digit is inserted.

Furthermore, because the first generating unit 42 recognizes a predetermined special character (such as the FNC1 character) as the field separator between data sets, the invention can also be used with barcodes that contain a plurality of data sets each having an application identifier and data portion. The user can also easily recognize the data sets in the HRI line B2 because this special character is converted to a space "_".

The first generating unit 42, second generating unit 43 and merging unit 44 may be included in the printer 40 in an embodiment of the invention, or could be part of the host computer 20. In this case the application 21 can be rendered to function as these three units, or the printer driver 23 can function as these units.

The means (functions) of the printer 40 described above can also be rendered as a computer-executable program. This program can be distributed or stored on a data recording medium (not shown in the figures). The data recording medium may be a CD-ROM, a flash ROM, a memory card (such as a CompactFlash (R)a Smart Media card, or a memory stick), a Compact Disc, a magneto-optical disk, a DVD disc, a floppy disk or a hard disk drive, for example.

The invention is also not limited to a printing system 10 as described above. For example, the invention can be applied to a stand-alone printer that both generates the print data and prints, and the hardware configuration and processing arrangement can be varied in many other ways without departing from the scope of the invention. The invention is also not limited to use with UCC/EAN-128 barcodes, and can be applied to any barcode that uses an application identifier.

What is claimed is:

1. A method of generating a barcode with a human readable interpretation where the barcode uses an application identifier, comprising the steps of:
    inputting characters as an input data set that is equivalent to the complete human readable interpretation with a first special character immediately before the application identifier, a second special character immediately after the application identifier, wherein each and every individual character in the input data set has a one to one correspondence with an individual symbol in the human readable interpretation, wherein the input data set comprises a series of unique data sets each comprising a unique application identifier and a unique data portion a third special character is inserted between each of the series of unique data sets;
    generating a barcode encoding data set for encoding the barcode based on the input data set, includes interpreting the second special character as a field separator between the application identifier and a data portion following the application identifier, and interpreting the third special character as a separator between data sets;
    generating a data set for the human readable interpretation based on the input data set includes converting the second special character to a second symbol and converting the third special character to a "_" (space), wherein the second special character as inputted is a graphical equivalent to the second symbol; and
    generating the barcode with the human readable interpretation includes combining the barcode encoding data set and the data set for the human readable interpretation.

2. The method of claim 1, generating the barcode encoding data uses only numeric characters in the input data set.

3. The method of claim 1, wherein:
    a fourth special character representative of a position in which a check digit is to be inserted into the barcode is in the input data set;
    generating the barcode encoding data further comprises replacing the fourth special character with the calculated check digit value; and
    generating the data set for the human readable interpretation further comprises replacing the fourth special character with the calculated check digit value.

4. The method of claim 3, in which the fourth special character is "*".

5. The method of generating a barcode with a human readable interpretation described in claim 1, wherein the barcode is a UCC/EAN-128 barcode.

6. An apparatus for generating in accordance with the method of claim 1.

7. The apparatus of claim 6 comprises:
    an input unit for inputting the characters;
    a first generating unit for generating the barcode encoding data set;
    a second generating unit for generating the data set for the human readable interpretation; and
    a merging unit for combining the barcode encoding data set and the data set for the human readable interpretation.

8. The apparatus of claim 6 further comprises a printer for printing the barcode.

9. The method of claim 1, in which the second symbol is a "_" (space).

10. The method of claim 1, in which:
    the first special character is ignored when generating a barcode encoding data set; and the first special character is converted to a first symbol when generating a data set for the human readable interpretation.

11. The method of claim 10 in which the first symbol is a first character "(" and the second symbol is a second character ")".

12. A data recording medium including a computer-executable program comprising instructions for performing the method of claim 1.

13. The method of claim 1, wherein:
the application identifier includes non-numeric data;
generating the barcode encoding data set ignores the non-numeric data in the application identifier; and
generating the data set for the human readable interpretation does not ignore the non-numeric data in the application identifier.

14. The method of claim 1, wherein:
the input data set includes non encoding characters which are not special characters and are not supported by the encoding scheme used to generate the barcode;
generating the barcode encoding data set step ignores the non-encoding characters; and
generating the data set for the human readable interpretation uses the non-encoding characters.

* * * * *